Feb. 1, 1949.    C. FARROW    2,460,684
METHOD AND APPARATUS FOR DEMAGNETIZING TUBING
Filed May 26, 1943    3 Sheets-Sheet 1

INVENTOR.
CECIL FARROW
BY Richey & Watt
ATTORNEYS

Feb. 1, 1949.   C. FARROW   2,460,684
METHOD AND APPARATUS FOR DEMAGNETIZING TUBING
Filed May 26, 1943   3 Sheets-Sheet 2

INVENTOR.
CECIL FARROW
BY Richey + Watts
ATTORNEYS

INVENTOR.
CECIL FARROW

ATTORNEYS

UNITED STATES PATENT OFFICE 2,460,684

METHOD AND APPARATUS FOR DEMAGNETIZING TUBING

Cecil Farrow, Bainbridge Township, Geauga County, Ohio, assignor to Republic Steel Corporation, Cleveland, Ohio, a corporation of New Jersey Application May 26, 1943, Serial No. 488,480

2 Claims. (Cl. 175—181)

This invention relates to methods and apparatus for demagnetizing metal objects and particularly elongated steel tubing, rods or the like.

During the process of non-destructive testing of tubing, rods or the like for defects, the articles may be subjected to a relatively intense direct current magnetic field. This field has a tendency to cause the articles to become permanently magnetized which may be, in some cases, highly undesirable both in subsequent machining operations and in the final product. Such a process of testing is shown and described in the United States Letters Patent to Knerr and Farrow, No. Re. 21,003 of February 10, 1939.

It is common knowledge that under certain conditions, a magnetized metal object can be demagnetized by subjecting the object to an alternating magnetic field that decreases in strength. This is often effected by placing the object in an alternating current field and gradually reducing the intensity of the field or by slowly withdrawing the object from the field.

In spite of the simplicity of the aforedescribed operation considerable difficulty has been encountered in commercial practice in demagnetizing the article, particularly in the field where quantity production is of paramount importance.

This situation is particularly true and its solution unusually difficult in the case of steel tube production, especially where demagnetizing was attempted near the vicinity of the tester or near a quantity of previously magnetized tubes. As a matter of fact trying to demagnetize tubing in the vicinity of the tester or another pile of tubes often resulted in increasing the magnetization rather than reducing it. Of course, each tube can be conveyed to some distant position well beyond the field of the tester or a quantity of tubes and the demagnetizing effected, but this results in considerable loss of time, entails a large waste of space, and is inconvenient.

Inasmuch as the presence of the strong D.C. field acts as a preventive for demagnetizing, the assumption would normally be to remove the tubes from this field and effect the demagnetizing away from the tester. Even attempts like this have failed because if a load of tubes is taken away from the tester, since each tube itself is magnetized, the magnetic field about a load of similarly poled tubes is sufficiently large to prevent demagnetization. To convey each tube singly to a place where there is a sufficiently small magnetic field utilizes much time and extra handling of the tubes.

By experiment it was discovered in demagnetizing at a distance from the tester if one half of the tubes in a pile were turned around end for end, that this reduced the external magnetic field and the individual tubes could be demagnetized by an ordinary alternating current demagnetizing coil. This, however, was found to be objectionable because it took considerable space to effect the turning of the tubes and necessitated rehandling of at least one half of the tubes resulting in a loss of time and labor.

By my present invention I have discovered a method and apparatus whereby the demagnetizing may be effected at or in proximity to the tester or a quantity of magnetized tubing quickly and efficiently.

It is therefore an object of my invention to provide an improved method for demagnetizing magnetized tubing, rods, bars or other objects made from magnetizable material.

It is another object of my invention to enable a demagnetizing of tubing, etc., in spite of the presence of a strong magnetic field.

It is another object of my invention to overcome the effect of the presence of a strong direct current magnetic field in demagnetizing operations.

In the following description especial reference is made to the invention in connection with the demagnetizing of tubes. It will, however, be understood that the invention may be applied equally well to rods, bars and other articles.

Figure 1:
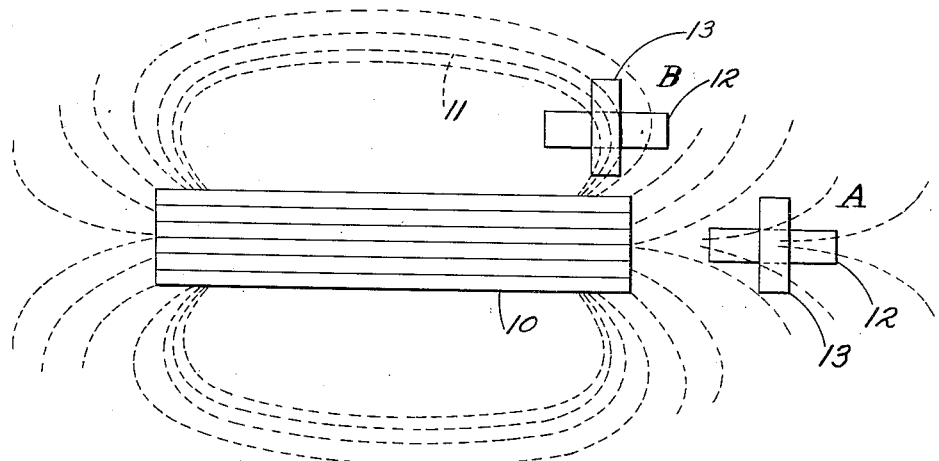
Fig. 1 is a diagrammatic view illustrating a pile of tubing and the magnetic fields of force thereabout and also depicting alternate positions to be taken by demagnetizing coils.

Referring to the drawings, throughout which like parts have been designated by like reference characters, as previously stated, the individual tubes from the test apparatus each have a degree of residual magnetism therein. When these tubes are assembled in a pile or load the cumulative effect of these individual magnets results in a relatively strong magnetic field being set up about the pile. This is best shown in Fig. 1 where a pile of tubes is indicated at 10 and the magnetic field of force about the tubes is illustrated by the dash lines 11.

It will be seen that if an alternating current demagnetizer, which comprises a tube guide 12 and a surrounding coil 13, is used at the end of the field at A, that the lines of force from the pile 10 are also longitudinal of the tube which is being demagnetized. I have found under such conditions if the tube was not already magnetized that treatment with this apparatus actually caused the tube to become magnetized. In any event demagnetizing with the apparatus so oriented could not be effectively accomplished.

However, I also found if I moved the demagnetizing unit to the place as indicated at B, that at this point the magnetic lines of force are transverse to the tube being demagnetized so that the magnetising effect is neutralized and demagnetizing could be effectively accomplished. This particular form of the invention, however, has an inconvenience in that the tube had to be moved sidewise and backward before it could be passed through the demagnetizer.

Figure 2:
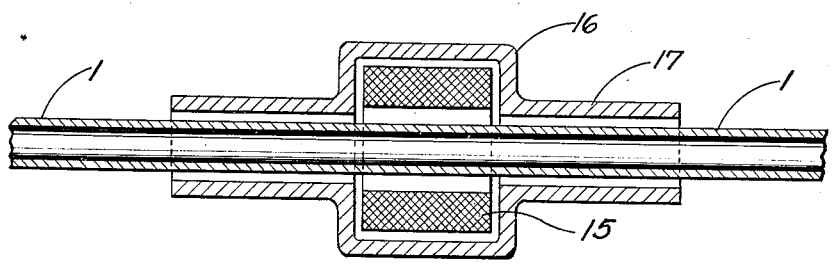
Fig. 2 is a vertical medial sectional view of a device for demagnetizing tubing.

Another method and apparatus which eliminates the above disadvantage and still allows for commercial demagnetization is illustrated in Fig. 2. In this device the alternating current demagnetizing coil 15 is provided and is housed in a soft iron or steel housing which comprises an enlarged body portion 16 in which the coil is disposed and having a pair of tubular extensions 17. In this case the tube 1 at its point of entrance and emergence from the coil is partially shielded from external magnetic field by the housing, which has a high permeability. The extent of the shielding may be increased by increasing the length of the tubular extensions 17. The magnetic shield also reduces the direct current field strength inside the alternating current demagnetizing coil 15 and thus substantially neutralizes the magnetising effect of the direct current. In operation this device may be placed at the end of the tester or in a position as illustrated in Fig. 1 at A and the unidirectional magnetic field is substantially by-passed and does not interfere with commercial demagnetization.

Figure 3:
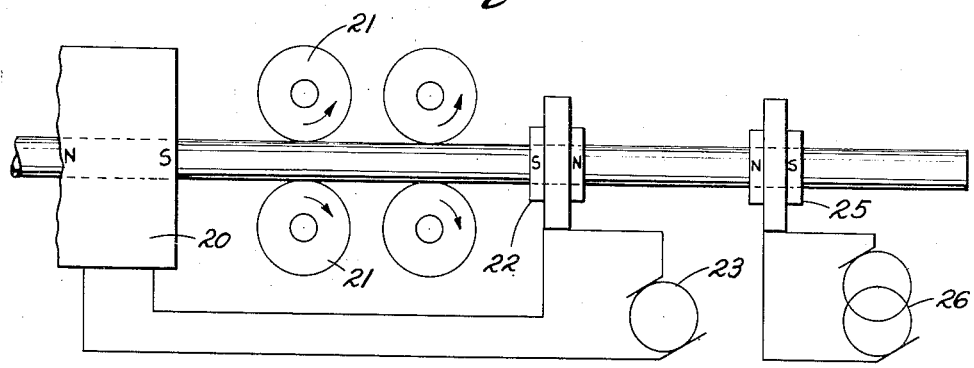
Fig. 3 is a schematic view of another form of the invention.

Another modification of the invention is illustrated in Fig. 3. In this case 20 indicates the direct current saturating coils of the tester which may be the same as or similar to that described in the aforementioned patent. The polarity of the coil is as indicated by the letters N and S. The tube 1 is moved from the coil 20 by the rollers 21 through a direct current energized blocking coil 22. This coil is so connected that its polarity as indicated is in opposition to that of the coil 20. If desired, it may be energized from the same current source 23. In the drawings the two coils are indicated as being serially connected, however, they do not have to be so connected; the important requisite being that the polarity of one opposes that of the other. The tube is passed through the coil 22 which should have enough strength to prevent the saturation coil 20 from interfering with the demagnetization. From the coil 22 the tube passes through the alternating current demagnetizing coil 25, which is energized from the alternating current source 26, and in this coil the tube is demagnetized.

A still further improvement in the apparatus of Fig. 3 comprises utilizing the shielded demagnetizing coil of Fig. 2 in place of the coil 25. In both instances the coil 22 acts as a bucking coil which neutralizes wholly or partially the effect of the saturation coil of the tester. In the last mentioned case the effect of stray fields is still further reduced by the shield which surrounds the demagnetizing coil.

Figure 4:
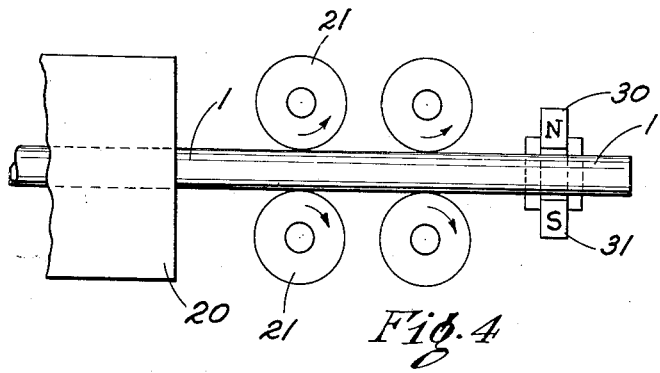
Fig. 4 is a schematic view of another apparatus for practicing the method of demagnetizing.
Figure 5:
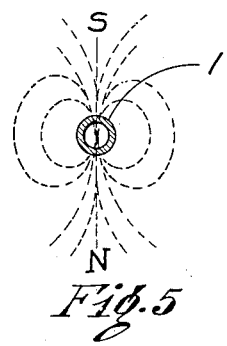
Fig. 5 is a cross sectional view of a tube as treated by the apparatus of Fig. 4 showing the direction of the magnetic field.

Fig. 4 schematically illustrates another modification of the invention, wherein the direct current saturation coil of the tester is illustrated at 20 and the tube is advanced from the tester coil by the rolls 21 to a pair of electro-magnet poles 30 and 31. These poles provide strong north and south magnetic poles, as indicated, on opposite sides of the tube. The tube is cross-magnetized by these magnets so that one side of the tube is of one polarity and the other side is of the opposite polarity. This condition is best shown in Fig. 5 which shows the fields of force indicated by the dash lines as extending transversely relative to the tube. After the tubes are thus cross-magnetized they are piled in a load and this causes the pile to have random polarity so that the external field around the load is negligible. Demagnetization of the single tubes can then be effected with the demagnetizing coil in position relative to the pile as indicated at A of Fig. 1. In some cases the cross-magnetization may not be objectionable, hence no further operation would be needed.

Figure 6:
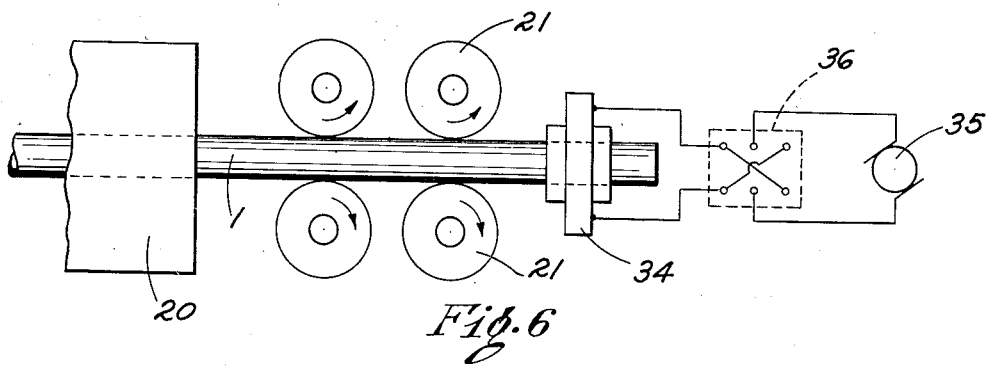
Fig. 6 is a schematic view of another form of the invention.
Figure 7:
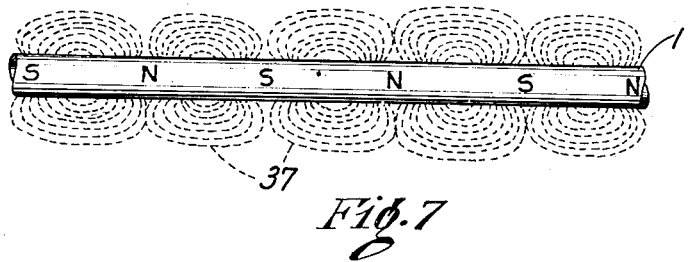
Fig. 7 is a diagrammatic view showing the magnetic fields of force set up in the tube by the device of Fig. 6.

Another method is illustrated schematically in Fig. 6. Here again the direct current saturation coil is illustrated at 20 and the drive rolls at 21. The tube is advanced by the rolls 21 to a coil 34 which is energized from a direct current source 35 through a reversing switch 36. The polarity of the coil 34 is therefore reversible by means of the switch 36. The switch 36 may be an automatic switch which automatically reverses the polarity of the coil 34 at intervals. This periodic reversal is carried out as the tube passes through the coil so that the tube has different or opposite polarites at various parts thereof. The condition of the tube after treatment with the apparatus of Fig. 6 is best illustrated in Fig. 7 where the fields of force are shown by the dash lines 37 and the polarity at different points of the tube indicated at N and S. This polarity is arranged by adjustment of the timing of the reversal switch so that it is random. If the polarity reversal is random from tube to tube, a load of the tubing will have negligible external magnetic field.

It is contemplated in the foregoing that a complete reversal of the field in the coil 34 be effected. However, by a modified method I contemplate an action wherein no reversal need be effected and random polarity is realized by merely operating the coil 34 with its polarity reversed relative to the direct current fields to merely reverse the magnetization of certain parts of the tube and allowing the remaining parts to retain their original magnetism. In this case the current to coil 34 is merely turned on and off.

In either event, the tubes having been given a random polarity are piled on a load and may be subsequently demagnetized in a regular alternating current demagnetizer as illustrated in Fig. 1. In some cases the subsequent demagnetization may not be needed. This would be true if there would be no commercial objection to the tubes with the short distance between opposite poles.

Figure 8:
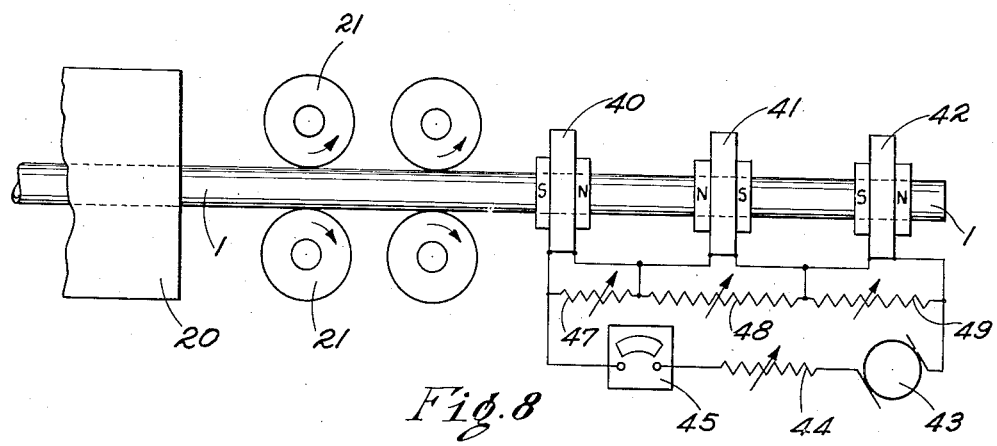
Fig. 8 is a schematic view of another modification of my invention.

Another modification of my invention is illustrated in Fig. 8. In this case the tube is subjected to a series of magnetic fields of opposite polarity and decreasing field strength. As in Fig. 2, the direct current saturation coil of the tester is indicated at 20 and the drive rolls at 21. Coils 40, 41 and 42 are direct current demagnetizing coils, which are energized from the direct current source 43. The coils may be connected to a series circuit including the direct current source 43, a variable resistor 44 and the ammeter 45; the coils also being connected in series with each other. Each of the coils is shunted by a variable resistor such as 47, 48 and 49, by means of which the current and hence the magnetic field of each coil may be regulated. The coils may also be connected in parallel, in which case each coil might have a variable series resistor. A separate ammeter may be provided for each coil. In operation the coil 40 should provide a magnetic field strength capable of reversing the magnetic polarity of the tube as it comes from the tester. This will vary depending on the material under test. In the coil 40 the polarity of the tube is reversed and the degree of magnetism is reduced. Coil 41 should provide sufficient field strength to reverse the polarity of the tube again and to leave the tube with still less magnetism. Coil 42 should be still weaker being merely sufficient to substantially remove the residual magnetism left by the coil 41. Although I have shown three such coils it is within the purview of my invention to provide more should it be desired. I have also found that less than three can sometimes be used and effectively reduce the magnetism of the tube.

Figure 9:
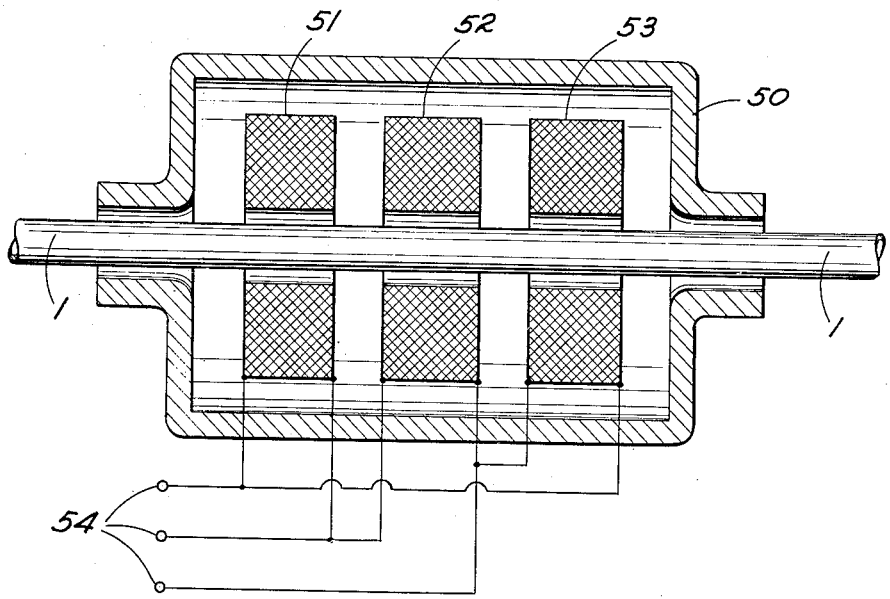
Fig. 9 is a vertical medial section of another modification of the invention.

Fig. 9 is a sectional view of a demagnetizer similar in some respects to that of Fig. 2. In this case a shell 50 of high permeability is provided to shield the coils from the strong external magnetic field. In this instance, however, means is provided to substantially reduce the carrying flux into the interior of the shielded space by the tube itself.

This is effected by providing an alternating current coil having three sections 51, 52 and 53 disposed inside the shield and connected at 54 to a polyphase alternating current supply. In this device, because of the phase difference between the currents in the three phase circuits some portion of the tube in the coils may be magnetized to saturation value at all times, thus substantially decreasing the amount of the exterior direct current flux which enters into the shielded space through the tube itself.

Although I have shown the coils in Fig. 9 as taking a particular form I also contemplate certain changes in the arrangement. For instance, I contemplate that the coils be mounted in the same manner as the stator of an induction motor. In this case the coils would be on the inside of the shell and spaced radially around the tube and the field produced would be a rapidly rotating field that at no time would pass through zero value. This rotating field inside of the shield makes the shield more effective.

Still another form of my invention comprises moving the tube rapidly through an alternating current field. That is, at speeds between ten and twenty feet per second, sections of reversed polarity are produced that are short enough so that for most purposes a tube can be considered as demagnetized. The result is similar to that shown in Fig. 7. In this case the frequency of the alternating current can be below 60 cycles per second and the design of the coil is such as to produce a relatively sharp zone between the coil field and the region where there is no magnetic field. This characteristic may be produced by placing a heavy copper ring near the exit end of the coil in such a position that the tube passes through the ring. This procedure therefore departs considerably from the conventional demagnetizing procedure where the article to be demagnetized is moved slowly out of an alternating current field.

It will thus be seen that I have provided a method of commercially demagnetizing magnetized tubing or the like, wherein the strong external magnetic field about a tester or a pile of tubing is prevented from hindering the demagnetizing of the article. It is therefore possible to demagnetize the tubing at the tester with a minimum of effort and apparatus which results heretofore were difficult, if not impractical, to obtain.

It will also be apparent from my discoveries, to those skilled in the art, that various departures may be made from the apparatus shown and described without departing from the spirit of my invention.

I claim:

1. The method of demagnetizing elongated magnetized articles in the presence of a steady magnetic field which comprises diverting the lines of force of the steady field around the article and subjecting the article to a magnetic field generated by a polyphase alternating current with magnetic fluxes of progressively different phase generated by said current applied along the length of the article.

2. An apparatus for demagnetizing magnetized elongated articles in the presence of a magnetic field which comprises a housing of high permeability material having a longitudinal axis, a plurality of coils disposed in said housing located in successive positions along said axis and arranged to provide a coaxial passage through which an article may be passed, a source of polyphase alternating current and means connecting the respective phases of the said source to the respective coils whereby an article passing through said housing is affected by magnetic fluxes of progressively different phase.

CECIL FARROW.

REFERENCES CITED

The following references are of record in the file of this patent:

UNITED STATES PATENTS

| Number | Name | Date |
| --- | --- | --- |
| 329,768 | Parkes | Nov. 3, 1885 |
| 824,812 | Plimpton | July 3, 1906 |
| 1,548,563 | Spencer | Aug. 4, 1925 |
| 1,708,936 | Cioffi | Apr. 16, 1925 |
| 2,207,392 | Zuschlag | July 9, 1940 |
| 2,246,542 | Smith | June 24, 1941 |
| 2,306,584 | Zuschlag | Dec. 29, 1942 |